United States Patent
Greenwood et al.

(10) Patent No.: US 8,771,133 B2
(45) Date of Patent: Jul. 8, 2014

(54) DRIVE MECHANISM FOR INFINITELY VARIABLE TRANSMISSION

(75) Inventors: Christopher J. Greenwood, Preston (GB); Andrew D. De Freitas, Wigan (GB); Robert A. Oliver, Preston (GB)

(73) Assignee: Torotrak (Development) Limited, Lancashire (GB)

( * ) Notice: Subject to any disclaimer, the term of this patent is extended or adjusted under 35 U.S.C. 154(b) by 974 days.

(21) Appl. No.: 12/376,699

(22) PCT Filed: Jul. 31, 2007

(86) PCT No.: PCT/GB2007/050460
§ 371 (c)(1),
(2), (4) Date: Aug. 22, 2011

(87) PCT Pub. No.: WO2008/017881
PCT Pub. Date: Feb. 14, 2008

(65) Prior Publication Data
US 2011/0300989 A1  Dec. 8, 2011

(30) Foreign Application Priority Data
Aug. 7, 2006 (GB) .................................. 0615598.0

(51) Int. Cl.
*F16H 13/10* (2006.01)
(52) U.S. Cl.
USPC .............................................. 476/41; 476/40
(58) Field of Classification Search
USPC ................................. 476/40, 41, 42
See application file for complete search history.

(56) References Cited

U.S. PATENT DOCUMENTS 3,412,622 A    11/1968  Rhodes et al. .................... 476/1
3,446,088 A *   5/1969  Grant ................................ 476/1

(Continued)

FOREIGN PATENT DOCUMENTS

DE    198 51 092    10/2011
EP    1 846 672     8/2010

(Continued)

OTHER PUBLICATIONS

International Preliminary Report on Patentability issued in PCT Application PCT/GB2007/050460 on Feb. 10, 2009.

(Continued)

*Primary Examiner* — David M Fenstermacher
(74) *Attorney, Agent, or Firm* — Fulbright & Jaworski LLP

(57) ABSTRACT

A variator transmission comprises an input shaft (18), an input disc (10) mounted on the input shaft for rotation therewith and an output disc (12) facing the input disc and arranged to rotate coaxially therewith, the input and output discs defining between them a toroidal cavity. Two rollers (14, 16) are located in the toroidal cavity and first and second roller carriage means are provided upon which the first and second rollers respectively are rotatably mounted and end load means (34, 36) urge the rollers into contact with the input and output discs to transmit drive. The two roller carriage means are mounted on opposite sides of the pivotal axis of a lever (50) and the pivotal axis of the lever (50) is movable in both the radial and non-radial directions with respect to the rotational axis of the input and output discs.

16 Claims, 2 Drawing Sheets

(56) References Cited

U.S. PATENT DOCUMENTS

| | | | |
|---|---|---|---|
| 3,933,054 A * | 1/1976 | Iseman | 476/8 |
| 5,267,920 A * | 12/1993 | Hibi | 476/40 |
| 6,066,067 A * | 5/2000 | Greenwood | 476/40 |
| 6,464,614 B2 * | 10/2002 | Dutson | 476/10 |
| 6,482,120 B2 * | 11/2002 | Kumura et al. | 476/40 |
| 6,863,637 B2 * | 3/2005 | Mori et al. | 476/40 |
| 6,866,609 B2 * | 3/2005 | Ervin | 476/40 |
| 7,211,023 B2 * | 5/2007 | Flaig et al. | 476/10 |
| 7,217,215 B2 * | 5/2007 | Miller et al. | 475/214 |
| 7,591,755 B2 * | 9/2009 | Petrzik et al. | 476/10 |
| 7,727,106 B2 * | 6/2010 | Maheu et al. | 476/1 |
| 8,152,687 B2 * | 4/2012 | Ruebusch et al. | 476/40 |
| 8,292,772 B2 * | 10/2012 | Greenwood | 475/192 |

FOREIGN PATENT DOCUMENTS

| | | |
|---|---|---|
| GB | 415076 | 8/1934 |
| GB | 2 423 122 | 8/2006 |
| JP | 07-091513 | 4/1995 |
| JP | 2002-357253 | 12/2002 |
| JP | 2004-225888 | 8/2004 |
| WO | WO 2006/084905 | 8/2006 |
| WO | WO 2007/051827 | 5/2007 |

OTHER PUBLICATIONS

International Search Report issued in PCT Application PCT/GB2007/050460 on Nov. 7, 2007.

* cited by examiner

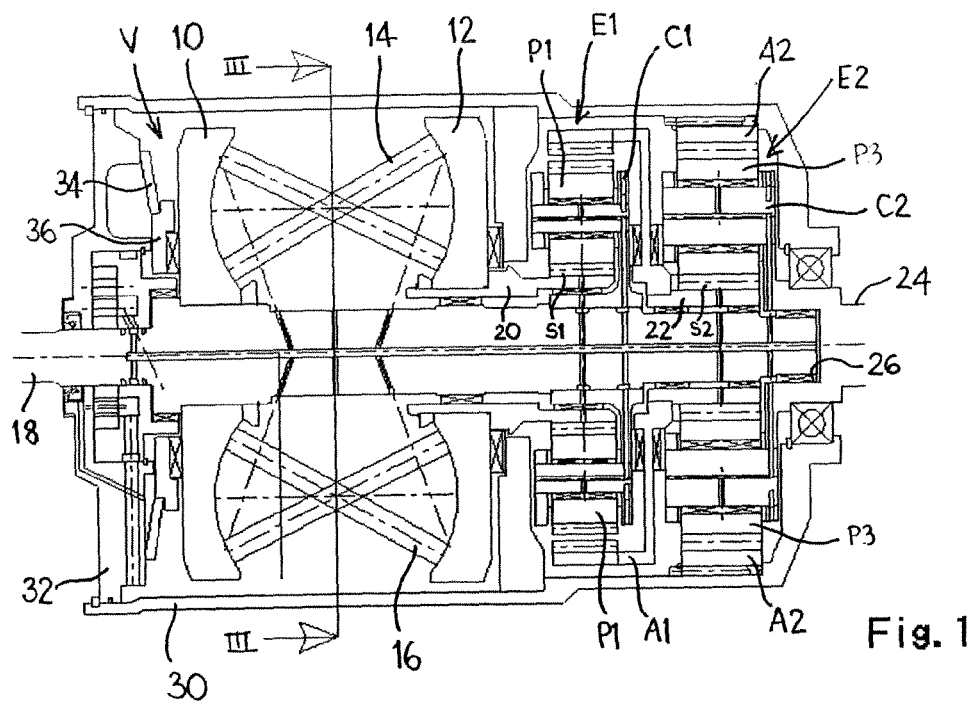
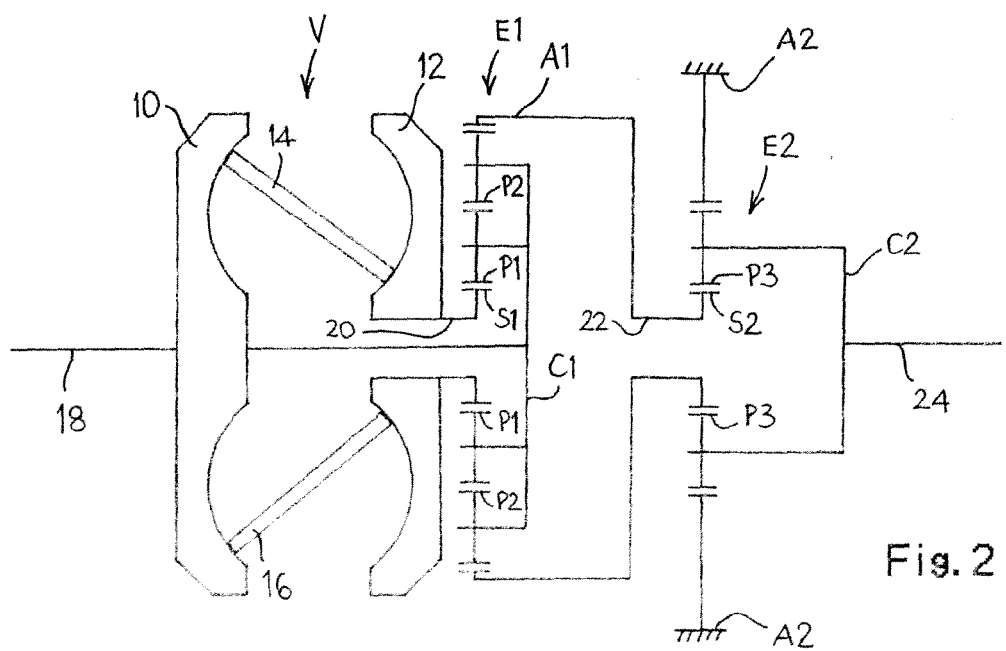

DRIVE MECHANISM FOR INFINITELY VARIABLE TRANSMISSION

CROSS REFERENCES TO RELATED APPLICATIONS

This application is a national phase application under 35 U.S.C. §371 of International Application No. PCT/GB2007/050460 filed Jul. 31, 2007, which claims priority to Great Britain Application No. 0615598.0 filed Aug. 7, 2006, both of which are incorporated by reference without disclaimer.

The present invention relates to infinitely variable ratio transmission apparatus of the toroidal race rolling traction type, hereinafter referred to as a variator.

The basic form of variator comprises a toroidally-recessed input disc connected to an input drive shaft and a toroidally-recessed output disc arranged coaxially with respect to the input disc. A plurality of rollers (usually three rollers) is provided in the toroidal cavity defined between the input and output discs and power is transmitted from the input disc to the output disc by means of the rollers. The rollers are mounted in roller carriages which are subjected to transverse forces (usually by means of double-acting hydraulic pistons). The same hydraulic pressure is normally applied to a so-called end load chamber to apply an axial force to one of the discs in order to ensure that the rollers are frictionally engaged with the input and output discs.

Such transmissions are mainly designed for use in relatively high power, high torque applications such as in motor vehicle transmissions. Indeed, in order to be able to handle the levels of power and torque and to provide a more balanced transmission, it is normally necessary to utilise a pair of input discs and a pair of coaxially mounted output discs, defining two toroidal cavities, each of which encloses three rollers. One advantage of using three rollers in each toroidal cavity is that the arrangement is inherently stable in that roller contact at three equally-spaced locations around the discs minimises bending of the variator components and therefore minimises wear. However, it is also normally necessary for each roller to be provided with its own double-acting control piston and for the hydraulic pressures to be controlled by computer.

Whilst the cost of such sophistication is acceptable in motor vehicle transmissions, it discourages the use of variators in less demanding environments.

There is therefore a need to provide simplified, low-cost variator for use in circumstances which are not so demanding.

Co-pending International Patent Application PCT/EP2006/050860 discloses a simplified, low-cost variator having two rollers in contact with a variator input disc and a variator output disc. Each roller is mounted on a respective roller carriage connected to opposite ends of a lever which is pivotable in response to operator input. The pivotal axis of the lever is movable in the radial direction with respect to the rotational axis of the input and output discs.

In the specific arrangement disclosed in PCT/EP2006/050860, the lever is provided with a pivot pin which is displaceable along a radially-extending slot in a lug which is fixed with respect to the variator housing. Whilst this arrangement works very well, this type of transmission is generally intended for use in low-cost mechanisms and it is therefore desirable to simplify the construction, and thereby reduce the cost, as much as possible.

In accordance with the present invention, there is provided a variator transmission comprising:
a housing;
an input shaft;
an input disc mounted on the input shaft for rotation therewith;
an output disc facing the input disc and arranged to rotate coaxially therewith, the input and output discs defining between them a toroidal cavity;
two rollers located in the toroidal cavity;
first and second roller carriage means upon which the first and second rollers are respectively rotatably mounted;
end load means to urge the rollers into contact with the input and output discs to transmit drive;
lever means having a pivotal axis, the two roller carriage means being mounted on the lever means on opposite sides of the pivotal axis; and
pivoting means for pivoting the lever means about the pivotal axis;
whereby the pivotal axis of the lever means is movable in the radial direction with respect to the rotational axis of the input and output discs and also has a component of movement in a non-radial direction.

By providing a variator transmission having only two rollers, and by controlling the rollers with lever means instead of hydraulically, it is possible to reduce the complexity and cost of the transmission and yet still provide a transmission which is suitable for relatively low-power, low-torque applications, as for PCT/EP2006/050860. However, allowing the pivotal axis of the lever to move in both the radial and non-radial directions also permits a simpler and lower-cost construction of the variator control mechanism.

Preferably, the pivoting means comprises an elongate recess in the lever means, engageable with a projection which is fixed with respect to the housing. The provision of recess in the lever which engages with a projection which is fixed with respect to the housing simplifies the construction of the transmission and therefore reduces its cost.

Preferably, the projection comprises a pivot pin fixed with respect to the housing, on which a slider block is pivotally mounted, the slider block being engaged with the recess in the lever means. Preferably, the width of the slider block is substantially the same as the width of the slot. Preferably, the pivotal axis is movable through a predetermined distance.

Preferably, the pivoting means for pivoting the lever means comprises an arm portion.

Preferably, pivot means (e.g. a spherical joint) are provided between each roller carriage means and the lever means.

Preferably, the input shaft and the output disc drive the inputs of a mixing epicyclic gear train, which is preferably arranged coaxially with respect to the input shaft.

There may also be reduction gear means connected to the output of the mixing epicyclic gear train.

Preferably, the end load means comprises resiliently deformable means. Preferably, the end load means comprises only resiliently deformable means.

The resiliently deformable means preferably extend between a transmission casing and one of the input and output discs The resiliently deformable means preferably comprises a spring, e.g a Belleville spring washer.

By way of example only, a specific embodiment of the present invention will now be described with reference to the accompanying drawings, in which:—

FIG. 1 is a longitudinal cross-section through an embodiment of variator transmission in accordance with the present invention;

FIG. 2 is a schematic representation of the transmission of FIG. 1; and

Figure 3:
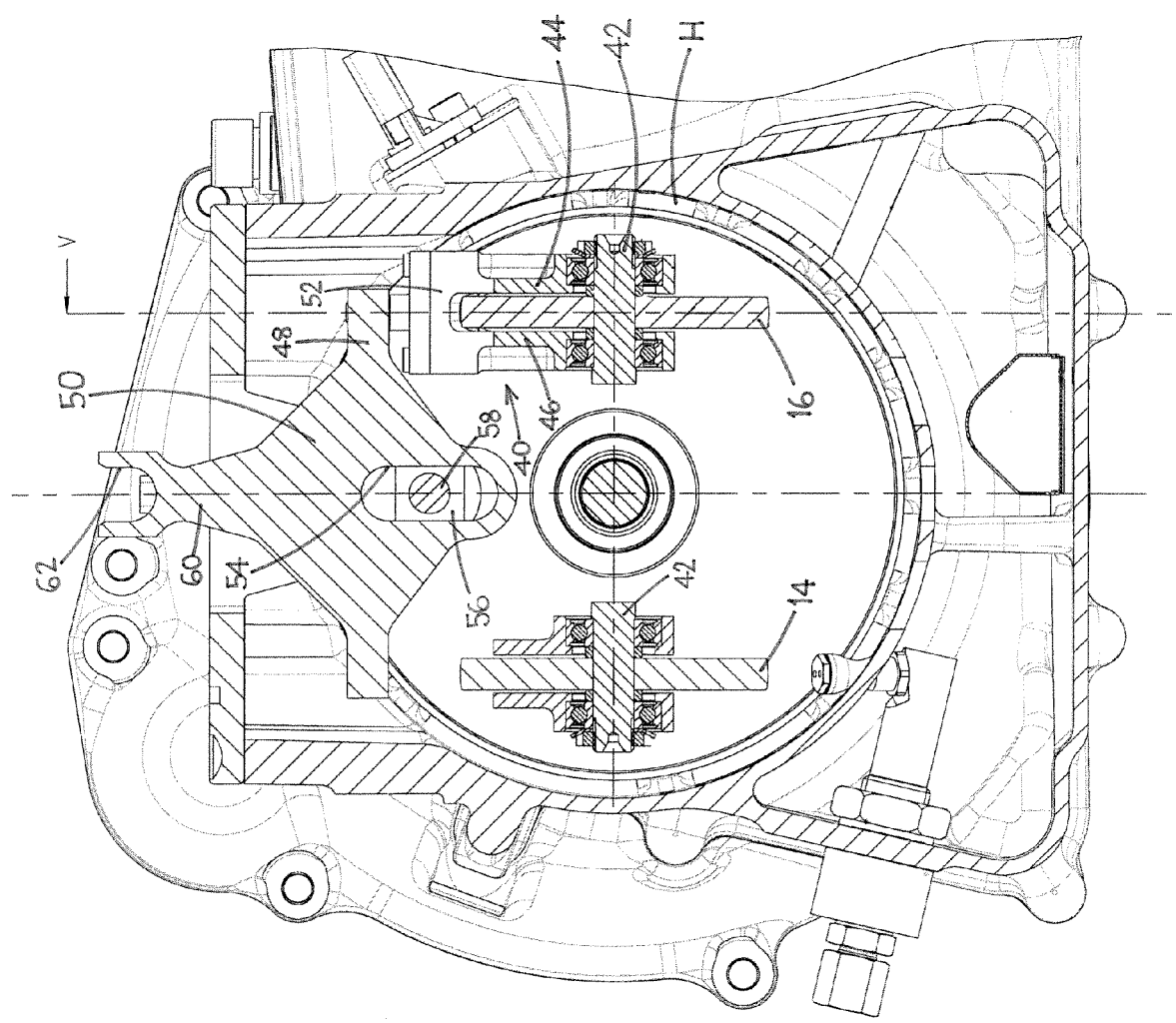
FIG. 3 is a cross-sectional front view of the transmission of FIG. 1 looking in the direction of arrows III-III showing the roller control means.

A continuously variable ratio transmission system comprises a variator V having a housing H enclosing a toroidally-recessed input disc 10 and a facing toroidally-recessed output disc 12. Two rollers 14, 16 are mounted in the toroidal cavity defined between the opposing toroidally-recessed faces of the input and output discs 10, 12 to transmit drive from the input disc 10 to the output disc 12 with a ratio which is variable by tilting the rollers 14, 16.

The input disc 10 is connected to, and rotates with, a system input shaft 18. The variator V provides an output via a tubular output shaft 20 which is connected to the output disc 12 and arranged coaxially with, and around, the input shaft 18. The input shaft 18 and the variator output shaft 20 provide the inputs to a compound mixing epicyclic gear train E1. As shown schematically, the end of the variator output shaft 20 remote from the output disc 12 carries a first sun gear S1 of the mixing epicyclic gear train E1. The carrier C1 of the gear train E1 is connected to, and driven by, the input shaft 18. The carrier C1 carries four identical equally-spaced radially inner planet gears P1 and four identical equally-spaced radially outer planet gears P2 (not visible in FIG. 1) of the same size as the radially inner planet gears P1. The radially inner planet gears P1 engage with the first sun gear S1 and with a respective one of the four radially outer planet gears P2. The radially outer planet gears P2 also engage with an internally-toothed annulus A1, which forms the output of the mixing epicyclic gear train E1. The output from the annulus A1 is connected via tubular coaxial output shaft 22 to a simple reducing epicyclic gearset E2. The reducing epicyclic gearset E2 comprises an input sun gear S2 carried by shaft 22 which meshes with four equally angularly spaced planet gears P3 carried by carrier C2. The planet gears P3 also mesh with an annulus A2 fixed to the transmission housing. The rotation of the carrier C2 forms the output of the reducing epicyclic gear set E2 and is transmitted to the exterior by an output shaft 24 which is connected to the carrier C2. The output shaft 24 is coaxial with the input shaft 18, one end of which is received in a recess 26 in the innermost end of the output shaft 24.

The gearing described above connected to the output shaft 20 is only one example of gearing which may be used. Other combinations of gearing may be used, depending on the requirements and intended use of the transmission.

The transmission is housed in a generally tubular casing 30 which supports the input and output shafts 18, 20. The end of the casing 30 adjacent the input shaft 18 is closed off by means of an end plate 32. A conical Belleville spring washer 34 extends between the inner face of the end plate 32 and an annular bearing plate 36 which is in rolling contact with an outer planar face of the variator input disc 10. The Belleville spring washer applies a force (an "end load") to the input disc 10 and permits torque to be transmitted form the input disc 10 via the rollers 14, 16 to the output disc 12.

By varying the inclination of the two rollers 14, 16 (as will be discussed below), the speed of the output disc 12 relative to the input disc 10 can be varied. By combining the rotations of the transmission input and variator output in the mixing epicyclic gear train E1, the output of the transmission can be varied. In the arrangement illustrated, the transmission can be varied between full reverse, through "geared neutral" to full forward. However, by appropriate selection of the gearing the operating range of the variator can be tailored to requirements. For example, the variator may be arranged to vary between low reverse through geared neutral and through to high forward overdrive if a vehicle to which the transmission were fixed normally operated in forward gear and only operated occasionally in reverse.

The mechanism for varying the inclination of the two rollers 14, 16 is shown in more detail in FIG. 3. Each roller 14, 16 is rotatably mounted in a roller carriage 40 by means of a stub axle 42 which is rotatably mounted in opposed planar support plates 44, 46 of the roller carriage (only one roller carriage 40 is shown in FIG. 3, but the other is identical). One end of each of the roller carriages 40 is connected to a respective one of the two ends of the cross-bar 48 of a control lever 50 by means of a spherical bearing 52 (e.g. a ROSE bearing manufactured by the ROSE BEARINGS LIMITED company). The control lever 48 is provided with a slot 54 located mid-way between the centre points of the two spherical bearings 52 and extending perpendicularly to the cross-bar 48 of the lever. The slot 54 receives a projection in the form of an elongate, straight-sided slider block 56 of the same width as the width of the slot 54. The slider block 54 is pivotally mounted on a pivot pin 58 which is fixedly mounted with respect to the housing of the variator.

The lever 50 is provided with an actuating arm 60 which projects out of the variator housing in a direction perpendicular to the line jointing the center points of the two spherical bearings 52 (i.e. perpendicular to the axis of the cross-bar 48 of the lever). The end of the arm 60 which projects out of the variator housing is provided with a hole 62 for connection of two Bowden cables (not shown) or other direct mechanical linkage for pivoting the lever in opposite directions. The connection will be a direct mechanical connection from the person operating the equipment of which the transmission is to form part. For example, the arm 60 may be connected to a vehicle accelerator pedal or to forward and reverse pedals.

As the lever 50 pivots, one of the rollers 10, 12 is pushed and the other is pulled, both with equal torque. The provision of a slot 54 in the lever 50 which is slidably disposed on a slider block which is pivotally mounted on a pivot fixed with respect to the housing allows the system to equalise because roller movement along the slot steers the rollers to positions that reduce torque transmitted by one and increase torque transmitted by the other. In this way, reaction forces are adjusted towards balance and therefore correct operation. This is important in low-cost assemblies, where the manufacture of the components is likely to be less accurate. The radial movement of the pivot of the lever allows the lever to move to a position in which any imbalance between the two rollers which arises from manufacturing differences will be cancelled out.

The arrangement described also allows a small lateral (i.e. non-radial) component of lever movement, making it simpler, and therefore cheaper, to produce than the arrangement disclosed in PCT/EP2006/050860.

The invention claimed is:

1. A variator transmission comprising:
   a housing;
   an input shaft;
   an input disc mounted on the input shaft for rotation therewith;
   an output disc facing the input disc and arranged to rotate coaxially therewith, the input and output discs defining between them a toroidal cavity;
   two rollers located in the toroidal cavity;
   first and second roller carriage means upon which the first and second rollers respectively are rotatably mounted;
   end load means to urge the rollers into contact with the input and output discs to transmit drive;

lever means having a pivotal axis, the two roller carriage means being mounted on the lever means on opposite sides of the pivotal axis; and pivoting means for pivoting the lever means about the pivotal axis;

whereby the pivotal axis of the lever means is movable in the radial direction with respect to the rotational axis of the input and output discs and also has a component of movement in a non-radial direction.

2. A variator transmission as claimed in claim 1, wherein the pivoting means comprises an elongate recess in the lever means, engageable with a projection which is fixed with respect to the housing.

3. A variator transmission as claimed in claim 2, wherein the projection comprises a pivot pin fixed with respect to the housing, on which a slider block is pivotally mounted, the slider block being engaged with the recess in the lever means.

4. A variator transmission as claimed in claim 3, wherein the width of the slider block is substantially the same as the width of the recess.

5. A variator transmission as claimed in claim 2, wherein the recess in the lever means comprises a slot.

6. A variator transmission as claimed in claim 1, wherein the pivotal axis of the lever means is movable through a predetermined distance.

7. A variator transmission as claimed in claim 1, wherein the pivoting means for pivoting the lever means about the pivotal axis comprises an arm portion.

8. A variator transmission as claimed in claim 1, further comprising pivot means between each roller carriage means and the lever means.

9. A variator transmission as claimed in claim 8, wherein the pivot means comprises a spherical joint.

10. A variator transmission as claimed in claim 1, wherein the input shaft and the output disc form the inputs of a mixing epicyclic gear train.

11. A variator transmission as claimed in claim 10, wherein the mixing epicyclic gear train is arranged coaxially with respect to the input shaft.

12. A variator transmission as claimed in claim 10, further comprising reduction gear means connected to the output of the mixing epicyclic gear train.

13. A variator transmission as claimed in claim 1, wherein the end load means comprises resiliently deformable means.

14. A variator transmission as claimed in claim 13, wherein the end load means comprises only resiliently deformable means.

15. A variator transmission as claimed in claim 13, wherein the resiliently deformable means extends between a transmission housing and one of the input and output discs.

16. A variator transmission as claimed in claim 15, wherein the resiliently deformable means comprises a spring.

* * * * *